D. K. INNES.
Composite Mantels for Fire Places.
No. 168,025. Patented Sept. 21, 1875.
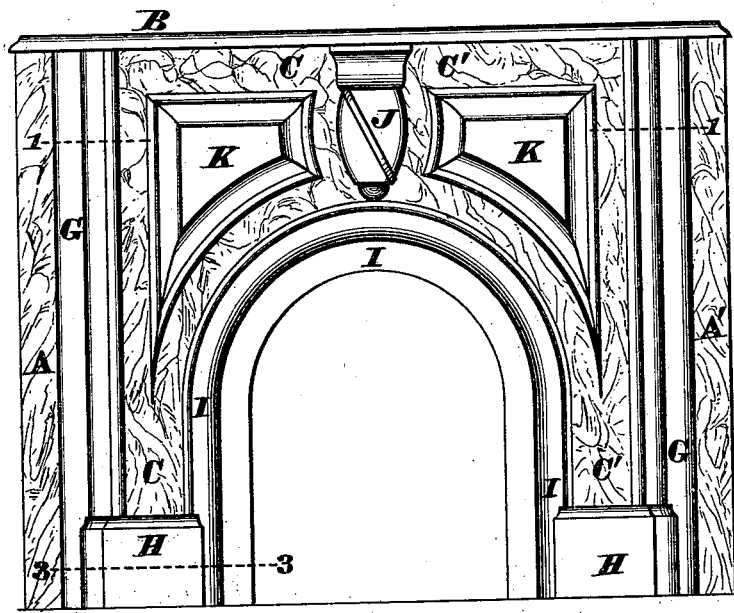
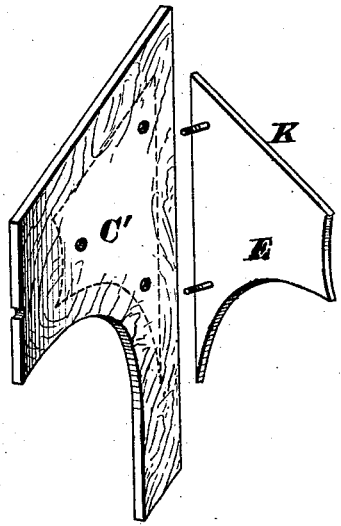
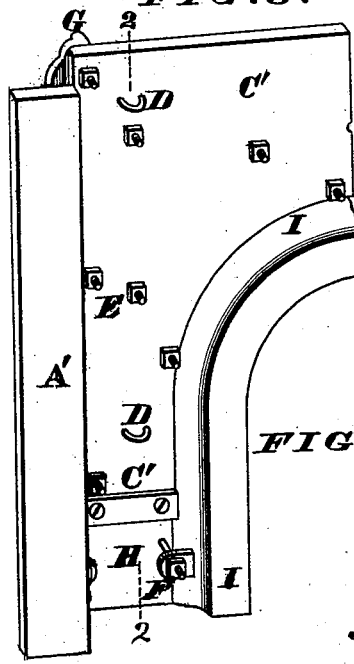
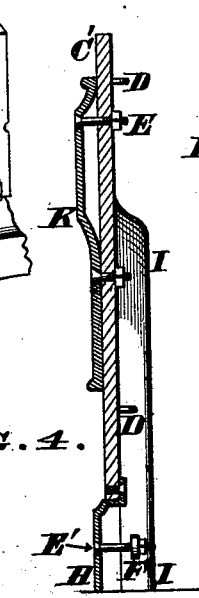
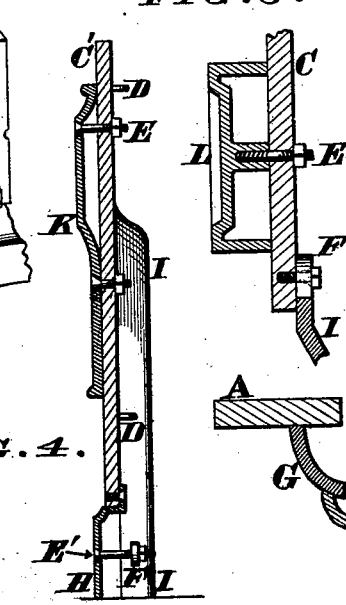
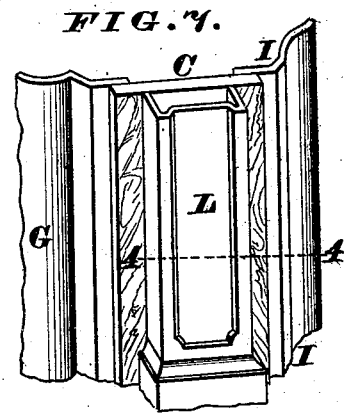
Attest:
Jas. H. Layman
Chas. J. Gooch
David K. Innes
By Knight Bros Attys

UNITED STATES PATENT OFFICE.

DAVID K. INNES, OF CINCINNATI, OHIO.

IMPROVEMENT IN COMPOSITE MANTELS FOR FIRE-PLACES.

Specification forming part of Letters Patent No. 168,025, dated September 21, 1875; application filed June 9, 1875.

*To all whom it may concern:*

Be it known that I, DAVID K. INNES, of Cincinnati, Hamilton county, Ohio, have invented a new and useful Composite Mantel for Fire-Places, of which the following is a specification:

The object of this improvement is to get a more elegant and perfect marble or marbleized slate or stone mantle at a less cost than any now manufactured, and of easier transportation, without injury by spalling or fracture. This purpose I accomplish by the use of cast-iron, instead of slate, stone, or marble, for most exposed and highly elaborated parts.

It is well known that in the manufacture of marble or marbleized slate or stone mantels the profile is usually a simple plain return-piece, and this is on account of the expense attending the use of a more ornate profile, as of a molded or quarter-column form, for example. The bases or plinths are, for the same reasons, usually a plain simple block, without molded ornamentation. The jambs or fire-circles are also a plain flat piece, and in all, save the most costly, mantels are destitute of carved or molded work. Likewise the panels or pilasters are usually flat, or, when cut, are a simple ogee, lacking boldness and beauty, no bold heavy moldings being admissible, on account of the extra work and thickness of material which would be required.

In the ordinary slate or stone mantel the profiles and bases are customarily secured to the body of the mantel by cast-iron anchors and knees, or angle-irons, the expense of which I obviate by my improvements, as the most elaborate molded design is chiefly produced in cast-iron, the necessary knees, angles, or screws being cast upon the rear surfaces of the parts intended to be attached to the mantel-body, which body, in turn, being of marble or marbleized stone or slate, presents, for the flat surfaces, the perfect evenness unattainable with iron. In other words, I make of marble, stone, or slate, those flat members for which a perfectly smooth and level surface is necessary, and of cast-iron those molded or more or less elaborated portions, where slight irregularities of surface are less conspicuous.

It is well known that mantels wholly composed of marble, slate, or stone, unless handled with great care, are liable to break or spall; but in my improvement, the slate, stone, or marble becomes, in a measure, iron-bound, so as to produce a much stronger mantel.

In the accompanying drawing, Figure 1 is an elevation, and Fig. 2 a section at line 1 1, of a composite mantel, embodying my improvements. Fig. 3 is a rear view of one-half of such mantel, and Fig. 4 a section at line 2 2. Fig. 5 shows a member of the marble body, and a corresponding iron panel detached. Fig. 6 is a section at line 3 3, enlarged. Fig. 7 represents a form of my improvement in which the marble member is attached in front of the iron profile and jamb, and has attached to its front an iron pilaster. Fig. 8 is a section at the line 4 4 enlarged.

A A' B may represent customary wall-pieces and shelf, and C C' represent spandrels or body pieces, all of marble or marbleized stone or slate. D are customary staples for anchoring the mantel to the chimney-breast.

Those parts of the mantle which compose the exterior edges or profiles, and especially such as have a molded or other ornate finish, consist, one or more of them, of iron castings, whose front surfaces have been suitably marbleized or enameled.

These cast members are united to the marble members by means of concealed nutted bolts, either cast permanently into the metal, as at E, or passing through concealed flanges F upon said castings, as at E'.

The said cast portions or members in the accompanying illustration consist of profile or return pieces G, plinths or bases H, jambs or fire-circles I, escutcheon or key-piece J, panels K, and pilasters L.

My invention is more particularly illustrated in Figs. 1, 2, 7, and 8, in which the comparatively ornate casing G I, below the body piece C, is of cast-iron, while the body piece itself, with extended flat surface, is of stone, slate, or marble, all being secured together by concealed bolts E.

I claim as new and of my invention—

The combination, in a fire-place mantel, of the cast-metal casing G I, beneath or behind, and cast-metal pilaster L, in front, of a flat and comparatively extended body piece, C, of slate, stone, or marble, the whole being united by concealed bolts E, substantially as set forth.

In testimony of which invention I hereunto set my hand.

DAVID K. INNES.

Attest:
GEO. H. KNIGHT,
JNO. C. HEALY.